(12) United States Patent
Sarrafin-Ardebili et al.

(10) Patent No.: US 12,142,420 B2
(45) Date of Patent: Nov. 12, 2024

(54) ELECTRICAL TRANSFORMER HAVING A CONTROLLED DISTRIBUTION OF LEAKAGE INDUCTANCE

(71) Applicant: Valeo Siemens eAutomotive France SAS, Cergy (FR)

(72) Inventors: Farshid Sarrafin-Ardebili, Cergy (FR); Gang Yang, Courbevoie (FR)

(73) Assignee: Valeo Siemens eAutomotive France SAS, Cergy (FR)

( * ) Notice: Subject to any disclaimer, the term of this patent is extended or adjusted under 35 U.S.C. 154(b) by 813 days.

(21) Appl. No.: 16/910,581

(22) Filed: Jun. 24, 2020

(65) Prior Publication Data
US 2020/0411234 A1  Dec. 31, 2020

(30) Foreign Application Priority Data

Jun. 27, 2019  (FR) ..................................... 1907024

(51) Int. Cl.
| | | |
|---|---|---|
| H01F 27/24 | (2006.01) | |
| H01F 27/28 | (2006.01) | |
| H01F 27/34 | (2006.01) | |
| H01F 41/02 | (2006.01) | |

(52) U.S. Cl.
CPC ............. *H01F 41/02* (2013.01); *H01F 27/24* (2013.01); *H01F 27/28* (2013.01); *H01F 27/346* (2013.01)

(58) Field of Classification Search
CPC ........ H01F 27/24; H01F 27/28; H01F 27/346; H01F 41/02
See application file for complete search history.

(56) References Cited

FOREIGN PATENT DOCUMENTS

| | | |
|---|---|---|
| GB | 2489532 A | 10/2012 |
| JP | H0567536 A | 3/1993 |

OTHER PUBLICATIONS

Search Report from French Intellectual Property Office on corresponding FR application (FR1907024) dated Mar. 9, 2020.

*Primary Examiner* — Holly Rickman
*Assistant Examiner* — Linda N Chau
(74) *Attorney, Agent, or Firm* — Alumen IP Law PC

(57) ABSTRACT

The present invention relates to an electrical transformer comprising a magnetic core and a primary coil, forming a primary circuit, and a secondary coil, forming a secondary circuit, electrical transformer configured such that:
a first inductance value $L_{1so}$ measured on the primary circuit with the secondary circuit open,
a second inductance value $L_{1ss}$ measured on the primary circuit with the secondary circuit short-circuited, and
a third inductance value $L_{2po}$ measured on the secondary circuit with the primary circuit open, are such that:

$$L_{2PO} - \frac{1}{n^2} L_M < \left(\frac{1}{A}\right) \cdot (L_{1SO} - L_M)$$

with $$L_M = \sqrt{(L_{1SO} - L_{1SS}) \times L_{1SO} \cdot N^2}$$

where A is a real number greater than 10.

7 Claims, 4 Drawing Sheets and # ELECTRICAL TRANSFORMER HAVING A CONTROLLED DISTRIBUTION OF LEAKAGE INDUCTANCE

TECHNICAL FIELD OF THE INVENTION

The present invention relates to the field of electrical transformers, for example integrated in resonant voltage converters or in any other type of power converter.

The present invention aims in particular to make it possible to control the distribution of the leakage inductance in an electrical transformer.

BACKGROUND

An electrical transformer makes it possible to transfer electrical energy from a primary circuit to a secondary circuit.

As is known, in an electrical transformer, a magnetic core and coils are used in which an electrical current circulates which generates a magnetic field enabling the transfer of electrical energy from the primary circuit to the secondary circuit. More precisely, in an electrical transformer, in particular in a magnetising inductance converter or in a resonant converter, there is a primary coil and a secondary coil, formed by windings around a magnetic core, between which electrical energy is transferred.

All electrical transformers have a leakage inductance, which results in a loss of efficiency because a part of the magnetic flux created on the primary circuit is not captured by the windings of the secondary circuit. Additional losses may moreover appear on the windings. In the case of non-resonant voltage converters, over-voltages my furthermore occur. The geometry of the coils of an electrical transformer, in the same way as the choice of the magnetic materials used for the magnetic core, or instead the geometry of said magnetic core, notably, are configured to respect specific electrical and magnetic criteria. An objective of the dimensioning of an electrical transformer notably resides in the control of the leakage inductance value of the electrical transformer.

It is also well known that, in an electrical transformer, on the primary circuit, a resonant inductance may be connected in series with the primary coil.

Whatever the envisaged applications, the resonant inductance is notably dimensioned as a discrete component, which operates with an electrical transformer itself dimensioned as a discrete component. However, such an electrical transformer may be configured either to minimise magnetic flux leakages, or in such a way that the resonant inductance is integrated in said electrical transformer as leakage inductance, so as to do away with a discrete electronic power component and thus reduce the cost and the bulk of the corresponding circuit.

A technical problem thus stems from the choice of integrating the resonant inductance in the electrical transformer while exploiting its leakage inductance; this assumes in fact controlling the distribution of the leakage inductance value of the electrical transformer between the primary circuit and the secondary circuit.

As an illustration, FIG. 1 shows an equivalent electrical diagram of a perfect LLC resonant converter, with an input voltage $V_{SqFHA}$, an output voltage $V_{OutFHA}$ and an output resistance $R_{FHA}$. The resonant capacitance Cs and the resonant inductance Ls are in series and the magnetising inductance Lp is in parallel with the output of the LLC resonant converter. In general, in an LLC resonant converter, it is desirable to place the resonant inductance Ls on the primary circuit.

In FIG. 2, an equivalent electrical diagram of a resonant converter LLC2 is represented, according to a non-perfect electrical transformer model, n, or sometimes referenced as N below, being the transformation ratio of the LLC2 resonant converter, with a non-negligible leakage inductance on the secondary circuit.

The resonant inductance is here integrated in the resonant converter LLC2, in the sense where there is no discrete electronic component Ls. The leakage inductance of the electrical transformer ensures the function of resonant inductance and comprises a component on the primary circuit $L_{LK1}$ and a component on the secondary circuit $L_{LK2}$.

So as to make the non-perfect model of the electrical transformer coincide as closely as possible with the equivalent circuit of the perfect resonant circuit LLC represented in FIG. 1, it is essential that the value of the leakage inductance on the primary circuit $L_{LK1}$ is close to the value of the resonant inductance Ls, while minimising the leakage inductance value on the secondary circuit $L_{LK2}$, in such a way that the leakage inductance on the secondary circuit $L_{LK2}$ is negligible compared to the leakage inductance on the primary circuit $L_{LK1}$. In other words, it is sought that the leakage inductance value on the secondary circuit $L_{LK2}$ is less than, or even negligible compared to the leakage inductance value on the primary circuit $L_{LK1}$.

Thus, notably, the operating point of the resonant converter LLC2, like any electrical transformer, its cut off frequency, and thus losses, are linked to the distribution of the leakage inductance value between the primary circuit and the secondary circuit. A poor distribution of the leakage inductance may lead to an important displacement of the operating point of the electrical transformer compared to its operating point defined as optimal, being able to cause a risk of overheating, or even the breakage of electronic power components of the electrical transformer.

In particular, in certain applications, the control of the distribution of the leakage inductance, between the primary circuit and the secondary circuit of an electrical transformer, is of great importance. For example, any type of resonant converter, including of LC, LLC or CLLC topology, require a leakage inductance which is concentrated on the primary circuit. However, for certain applications of reversible electrical converter, such as converters of DAB (dual active bridge) type, it is possible that a non-negligible leakage inductance on the secondary circuit is desired.

In numerous cases of use, it is however particularly advantageous that the essential part of the leakage inductance value is found on the primary circuit, so as to ensure the resonant inductance function of the electrical transformer in a resonant circuit of LC, LLC or CLLC type.

The present invention notably makes it possible to determine the distribution of the leakage inductance value of an electrical transformer between a leakage inductance on the primary circuit and a leakage inductance on the secondary circuit. The invention also makes it possible to determine the magnetising inductance value of the electrical transformer.

Henceforth, the present invention in particular makes it possible to produce an electrical transformer having a desired leakage inductance, notably concentrated on the primary circuit.

SUMMARY OF THE INVENTION

More precisely, the invention relates to an electrical transformer comprising a magnetic core and a primary coil, forming a primary circuit, and a secondary coil, forming a secondary circuit, electrical transformer configured such that:

a first inductance value $L_{1so}$ measured on the primary circuit with the secondary circuit open, a second inductance value $L_{1ss}$ measured on the primary circuit with the secondary circuit short-circuited, and a third inductance value $L_{2po}$ measured on the secondary circuit with the primary circuit open, are such that:

$$L_{2PO} - \frac{1}{n^2} L_M < (1/A) \cdot (L_{1SO} - L_M) \quad \text{[Math. 1]}$$

with $$L_M = \sqrt{(L_{1SO} - L_{1SS}) \times L_{1SO} \cdot N^2} \quad \text{[Math. 2]}$$

where A is a real number greater than 10.

According to an embodiment, A is a real number greater than or equal to 50.

According to an embodiment, A is a real number less than or equal to 100.

The invention also relates to a method for producing a transformer, said electrical transformer having a magnetic core, a primary circuit and a secondary circuit, said method comprising the following steps:

the selection of a magnetic core geometry for the electrical transformer to produce;

the determination of a thickness of air gap corresponding to a desired magnetising inductance value of the electrical transformer to produce;

the winding of secondary windings on a magnetic core having the selected geometry and thickness of air gap, so as to cover said air gap;

the determination of a leakage reluctance value of the electrical transformer as a function of the ratio between a desired leakage inductance value on the primary circuit of the electrical transformer to produce, and the desired magnetising inductance value of the electrical transformer to produce;

the determination of a distance h between the primary windings, configured to form the primary circuit of the electrical transformer to produce and the secondary windings, as a function of said leakage reluctance value;

the winding of primary windings on the magnetic core of the electrical transformer at said distance h from the secondary windings.

According to an embodiment, the magnetic core is selected from type E or type EI.

According to an embodiment, the following equation is implemented $$L_M = N_1^2 * \frac{\mu_0 S}{e} \quad \text{[Math. 3]}$$

where $N_1$ is the number of windings on the primary circuit, $\mu_0$ is the electromagnetic permeability of air and S is the effective magnetic cross section area of the electrical transformer, to determine the value of the required thickness e of the air gap, corresponding to the desired magnetising inductance value $L_M$.

According to an embodiment, the following equations are implemented $$R_{gap} = \frac{1}{\mu_0} * \frac{e}{S} \quad \text{[Math. 4]}$$

where Rgap is the air gap reluctance of the electrical transformer, $\mu_0$ is the electromagnetic permeability of air, e is the thickness of the air gap of the electrical transformer and S is the effective magnetic cross section area of the electrical transformer and $$\frac{Rgap}{Rleakage} = \frac{Lf1}{L_M} \quad \text{[Math. 5]}$$

where Rleakage is the leakage reluctance of the electrical transformer, Lf1 is the leakage inductance on the primary circuit of the electrical transformer and $L_M$ is the magnetising inductance of the electrical transformer, to determine the value of the leakage reluctance of the electrical transformer.

According to an embodiment, the following equation is implemented:

$$Rleakage = \frac{1}{2\mu_0} * \frac{l}{h*m} \quad \text{[Math. 6]}$$

where Rleakage is the leakage reluctance of the electrical transformer, $\mu_0$ is the electromagnetic permeability of air, m is the magnetic core depth of the electrical transformer and l is the width of an electromagnetic leakage zone between the primary windings and the secondary windings, corresponding to the distance separating an outer leg and a central leg of the magnetic core of type E or of type EI, to determine the value of the distance h between the primary windings and the secondary windings.

BRIEF DESCRIPTION OF THE DRAWINGS

The invention will be better understood on reading the description that follows, given uniquely as an example, and by referring to the appended drawings given as non-limiting examples, in which identical references are given to similar objects and in which.

Figure 1:
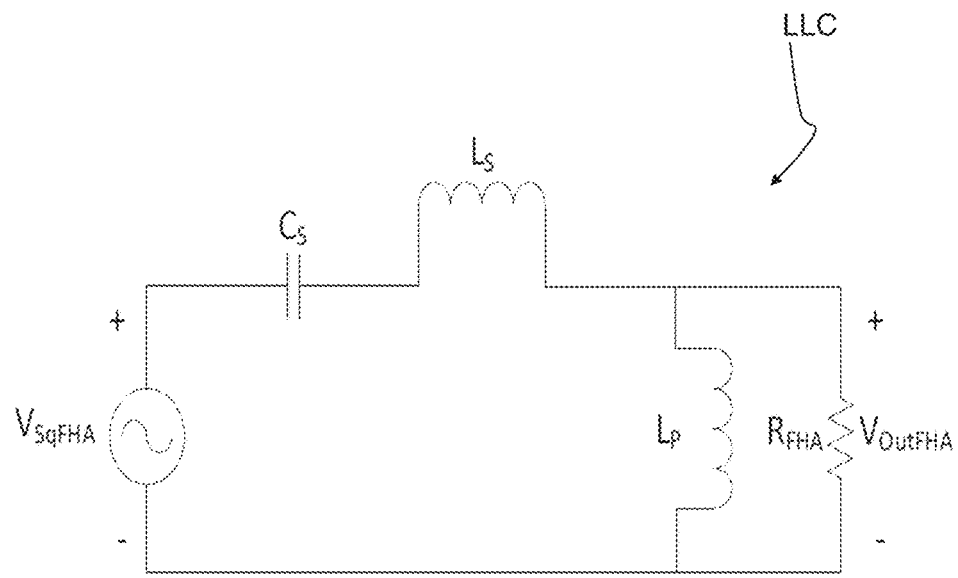
FIG. 1 (already described) represents the equivalent electrical circuit of a perfect resonant converter.
Figure 2:
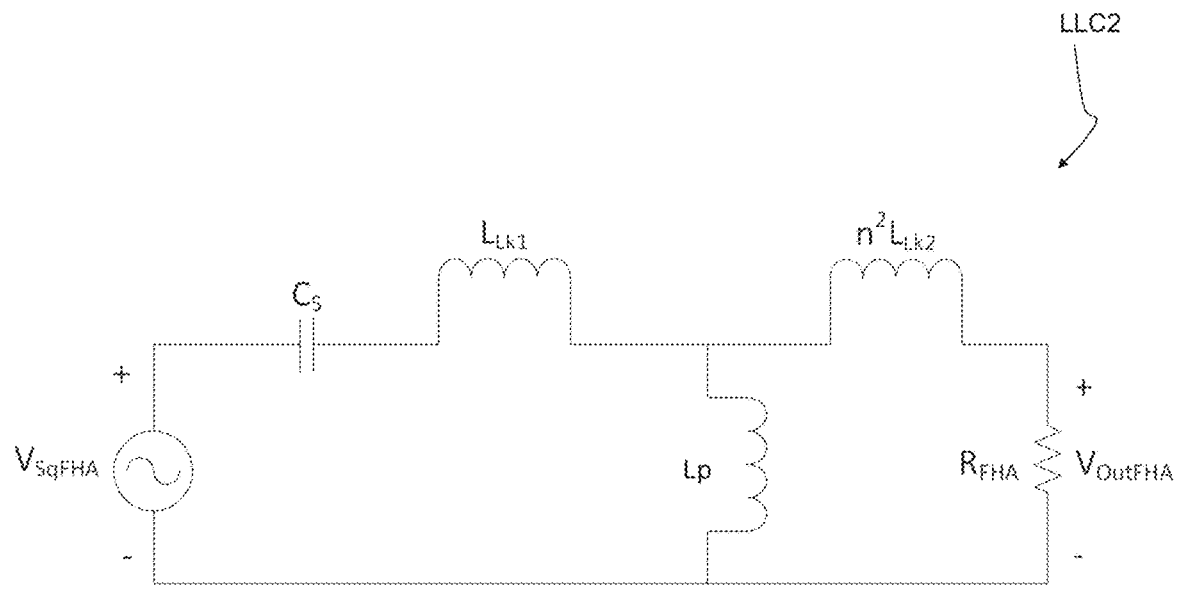
FIG. 2 (already described) represents the equivalent electrical circuit of a non-perfect resonant converter.

It should be noted that the figures set out the invention in a detailed manner for implementing the invention, said figures obviously being able to serve to better define the invention if need be.

DETAILED DESCRIPTION

The present invention makes it possible to determine the value of leakage inductances, respectively on the primary circuit and on the secondary circuit, in an electrical transformer.

A derived objective resides in the adaptation of the geometry of an electrical transformer so that said leakage inductances on the primary circuit and on the secondary circuit are in accordance with desired inductance values, respectively on the primary circuit and on the secondary circuit. In particular, when the electrical transformer is supplied on the primary circuit uniquely, magnetic fluxes, non-cabled to the secondary circuit, leak to the primary circuit. This situation corresponds to the equivalent magnetic circuit represented, as an example, in FIG. 3.

Notably, as indicated previously, it may be desired that the essential part of the leakage inductance value of an electrical transformer is found on the primary circuit. In other words, in this case, it is sought to minimise the leakage inductance value on the secondary circuit. It is then desired that the leakage inductance value on the secondary circuit is small compared to the inductance value on the primary circuit, for example at least ten times smaller, preferably 50 to 100 times smaller.

For a considered electrical transformer, having notably a specific geometry, the invention makes it possible to determine the leakage inductance on the primary circuit, the leakage inductance value on the secondary circuit and the magnetising inductance value.

To this end, three inductance measurements are carried out on said electrical transformer.

A first inductance measurement is carried out on the primary circuit $L_{1so}$, with the secondary circuit open.

A second inductance measurement is carried out on the primary circuit $L_{1ss}$, with the secondary circuit short-circuited, A third inductance measurement is carried out on the secondary circuit $L_{2po}$, with the primary circuit open.

Next, the following system of equations is resolved:

$$L_{1SO} = L_{Lk1} + L_M \quad \text{[Math. 7]}$$

$$L_{1SS} = L_{Lk1} + \frac{L_M \cdot n^2 \cdot L_{Lk2}}{L_M + n^2 \cdot L_{Lk2}} \quad \text{[Math. 8]}$$

$$L_{2PO} = L_{Lk2} + \frac{1}{n^2} \cdot L_M \quad \text{[Math. 9]}$$

The value of the leakage inductance on the primary $L_{Lk1}$, the value of the leakage inductance on the secondary $L_{Lk2}$ and the value of the magnetising inductance $L_M$ of the electrical transformer are thus determined.

Thanks to the knowledge of the values of the leakage inductance on the primary circuit $L_{Lk1}$, the leakage inductance on the secondary circuit $L_{Lk2}$ and the magnetising inductance $L_M$, and given desired values of the leakage inductance on the primary circuit and the leakage inductance on the secondary circuit, the geometry of the electrical transformer is adapted so as to tend towards said desired values.

In particular, to concentrate the value of the leakage inductance of the electrical transformer on the primary circuit, it is ensured that the ratio between the leakage inductance on the primary circuit and the leakage inductance on the secondary circuit is greater than 10, notably comprised between 10 and 100, in particular comprised between 50 and 100.

In other words, according to the invention, the electrical transformer is preferably configured in such a way that the first inductance measurement on the primary circuit $L_{1so}$, the second inductance measurement on the primary circuit $L_{1ss}$, and the third inductance measurement on the secondary inductance circuit $L_{2po}$ measured on the secondary circuit with the primary circuit open, are such that:

$$L_{2PO} - \frac{1}{n^2} L_M < (1/A) \cdot (L_{1SO} - L_M) \quad \text{[Math. 10]}$$

with $$L_M = \sqrt[4]{(L_{1SO} - L_{1SS}) \times L_{1SO} \cdot N^2} \quad \text{[Math. 11]}$$

where A is a real number greater than 10, notably greater than 50, notably less than or equal to 100, and N is the transformation ratio of the electrical transformer.

Figure 3:
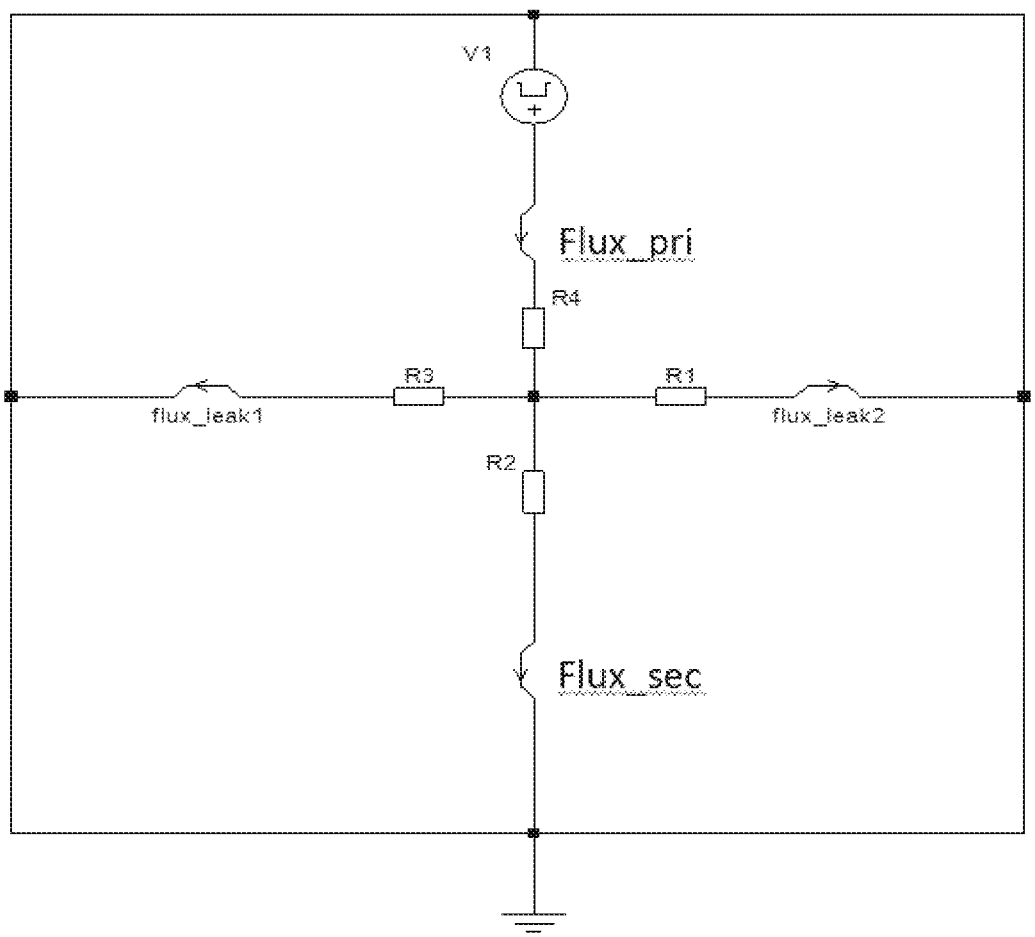
FIG. 3 represents the equivalent magnetic circuit of an electrical transformer having a given geometry.

An objective of the invention is thus to produce an electrical transformer, by configuring as desired the distribution of the leakage inductance of said electrical transformer, notably by concentrating said leakage inductance on the primary circuit. To this end, an equivalent magnetic circuit of the electrical transformer is produced, as a function of its geometry, as represented in FIG. 3. The equivalent magnetic circuit represented in FIG. 3 thus corresponds to a given geometry of an electrical transformer supplied by a voltage V1, said electrical transformer being considered, in terms of positioning of the primary and secondary coils, transformation ratio, number and dimensions of the legs of the magnetic core, position of the air gap, etc., with values for equivalent electrical components, in particular for the equivalent reluctances R1, R2, R3, R4. These values are not easily measurable, but it is possible to influence their distribution by modifying the geometry of the electrical transformer.

With reference to FIG. 3, a total magnetic flux flux_total is thus represented of which a portion flux_sec is transferred to the secondary circuit whereas two other portions flux_leak1, flux_leak2 correspond to the magnetic fluxes leaking to the primary circuit.

Starting from the equivalent magnetic diagram of FIG. 3, it is possible, thanks to the knowledge of desired values of the magnetising inductance and leakage inductances on the primary circuit $L_{LK1}$ and on the secondary circuit $L_{LK2}$, notably determined in accordance with the invention and corresponding to the electrical transformer considered or to produce, on account of its type of geometry, to determine the geometric criteria of the electrical transformer, of which in particular the thickness of the air gap and the relative positioning of the primary and secondary coils.

Other geometric criteria may be taken into account within the context of the implementation of the method for producing an electrical transformer according to an example of the invention, of which the position of the air gap, the number and the dimensions of the legs of the magnetic core, for example, to influence the distribution of the equivalent reluctances R1, R2, R3, so as to obtain a desired distribution of the value of the leakage inductances in the electrical transformer. For example, it is possible to analyse the equivalent magnetic circuit of FIG. 3 in correspondence with the electrical transformer diagram of FIG. 4. Henceforth, on the equivalent magnetic circuit of FIG. 3, the reluctances R1 and R3 represent the leakage reluctances corresponding to the leakage zones S1, S2 in FIG. 4. The reluctance R2 represents the air gap reluctance G, covered by the secondary winding 2 in FIG. 4. Thus, by reducing the value of the leakage reluctances R1 and R3, compared to the reluctance R2, the magnetic flux that traverses the zone separating the primary and secondary windings is increased and, thus, the value of the leakage inductance on the primary circuit is increased. This reduction in value of the leakage reluctances R1, R2 may notably be achieved by moving apart of the primary and secondary windings.

It is necessary to choose a magnetic core geometry such that the air gap is surrounded, on either side, by a winding belonging on the secondary coil, with a view to minimising the leakage inductance on the secondary circuit $L_{LK2}$. By analysing the equivalent magnetic circuit of FIG. 3, in the "opposite" sense and by displacing the voltage source V1 on the side of secondary flux flux_sec, the reluctances R1 and R3, 100 times greater compared to the reluctance R4 of the magnetic circuit, block the crossing of any magnetic leakage flux. Consequently, all the magnetic flux will pass through the primary flux flux_pri with a minimised leakage flux.

Figure 4:
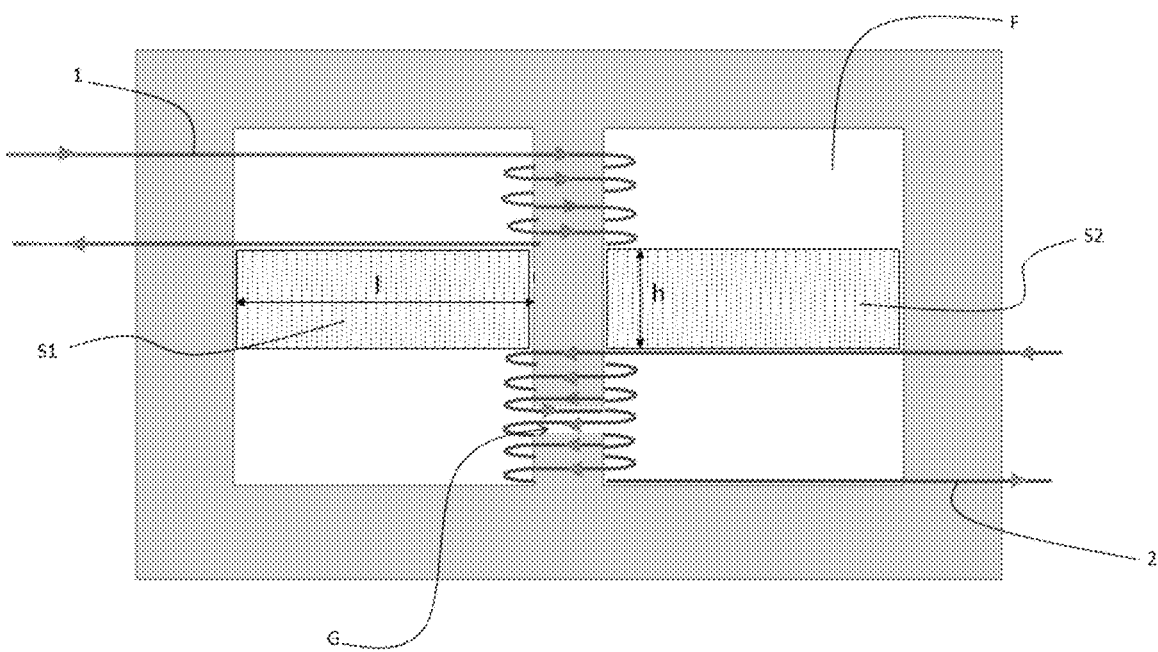
FIG. 4 shows the diagram of an electrical transformer according to an exemplary embodiment of the invention.
Figure 5:
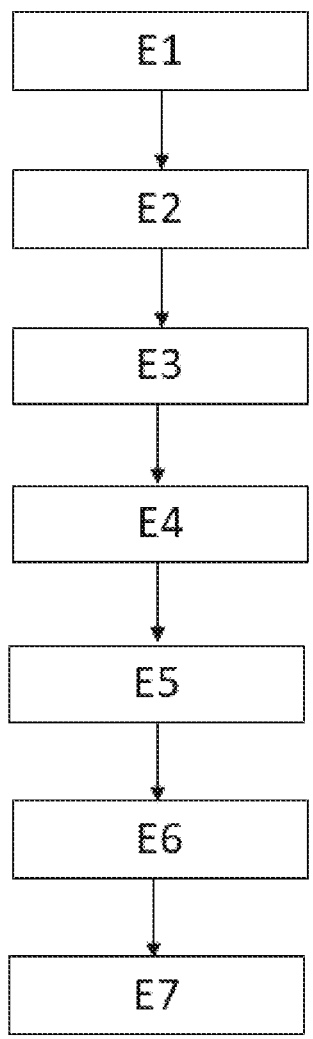
FIG. 5 represents a block diagram showing the steps of implementing the method for producing an electrical transformer according to an example of the invention.

With reference to FIGS. 4 and 5, a method for producing an electrical transformer based on the exploitation of the equations and principles proposed previously will now be detailed, relative to the distribution of the leakage inductance of an electrical transformer between the primary circuit and the secondary circuit.

The example detailed hereafter more particularly relates to an electrical transformer with integrated leakage inductance concentred on the primary circuit, having a magnetic core F of type E or of type EI.

To produce an electrical transformer with a desired magnetising inductance value $L_M$ and the desired leakage inductance value and concentrated on the primary circuit, the equations developed hereafter are implemented.

$$L_M = N_1^2 * \frac{\mu_0 S}{e} \quad \text{[Math. 12]}$$

with:

N1 is the number of primary windings;

$\mu_0$ is the permeability of air;

S is the effective magnetic cross section area of the electrical transformer;

e is the thickness of the air gap G of the electrical transformer.

$$Rgap = \frac{1}{\mu_0} * \frac{e}{S} \quad \text{[Math. 13]}$$

with $R_{gap}$ the air gap reluctance G.

$$\frac{Rgap}{Rleakage} = \frac{Lf1}{L_M} \quad \text{[Math. 14]}$$

with:

Rleakage is the leakage reluctance of the electrical transformer;

Lf1 is the desired leakage inductance value of the electrical transformer on the primary circuit;

$L_M$ is the desired magnetising inductance value of the electrical transformer.

The leakage reluctance Rleakage between the primary 1 and secondary 2 windings takes into account the zones S1, S2 between the primary windings 1 and the secondary windings 2.

Henceforth, for an electrical transformer having a magnetic core F of type E or of type EI, with a magnetic core depth noted m, the leakage reluctance Rleakage may be estimated by means of the following equation:

$$Rleakage = \frac{1}{2\mu_0} * \frac{l}{h * m} \quad \text{[Math. 15]}$$

where h is the distance separating the primary 1 and secondary 2 windings and l the width of the zones S1, S2, as indicated in FIG. 4. The width 1 thus corresponds to the width of an electromagnetic leakage zone between the primary windings 1 and the secondary windings 2, corresponding to the distance separating an outer leg and a central leg of the magnetic core F of type E or of type EI Certain electrical transformers, notably having a magnetic core of PQ type, have a magnetic core depth having a non-constant value. In this case, an estimated root mean square value of the magnetic core depth may be used to implement the method for producing an electrical transformer according to an example of the invention.

For another geometry of electrical transformer according to which the windings of the primary circuit are distributed on two upper and lower portions, on either side of the secondary windings, the calculated distance h may be calculated as corresponding to the sum of the two respective distances between each portion of the windings of the primary circuit and the windings of the secondary circuit, distributed in a symmetrical manner.

Known simulation tools may furthermore be implemented to analyse the value of the leakage reluctance Rleakage of the electrical transformer to produce.

To design and produce an electrical transformer, in accordance with the invention, notably an electrical transformer wherein the leakage inductance value is concentrated on the primary circuit, it is consequently advisable to implement the steps below, with reference to FIG. 5.

Firstly, (step E1) the desired value of the leakage inductance Lf1 and that of the magnetising inductance $L_M$ of the electrical transformer to produce are defined. Next, it is advisable to choose (step E2) a magnetic core geometry, for example, according to the example of FIG. 4, a magnetic core of type E, for the electrical transformer to produce. Henceforth, the above equation [Math. 12] (step E3) is applied to calculate the required thickness e of the air gap G, corresponding to the desired value of the magnetising inductance $L_M$. The secondary windings 2 are then wound (step E4) on the magnetic core F corresponding to the chosen geometry and to the calculated thickness of air gap G, so as to cover said air gap G entirely by the secondary windings 2. Thanks to the equations [Math. 13] and [Math. 14], the value of the leakage reluctance Rleakage is calculated (step E5) as a function of the ratio between the desired value of the leakage inductance Lf1 on the primary circuit, which, preferably, concentrates the leakage inductance of the electrical transformer, and the desired value of the magnetising inductance $L_M$ of the electrical transformer. Thanks to the equation [Math. 15], the value of the distance h between the primary windings 1 and the secondary windings 2 is calculated (step E6). The primary windings 1 are then wound (step E7) on the magnetic core of the electrical transformer in order to respect said distance h.

If need be, adjustments of the arrangement of the primary 1 and/or secondary 2 windings may be carried out as a function of actual measurements of the leakage inductances and the magnetising inductance on the electrical transformer thus produced. These complementary measurements make it possible to finely adjust the distance h to reach the desired leakage inductance value on the primary in an even more precise manner.

The invention claimed is:

1. An electrical transformer comprising a magnetic core and a primary coil, a primary circuit, a secondary coil, and a secondary circuit, the electrical transformer configured such that:
- a first inductance value $L_{1so}$ measured on the primary circuit with the secondary circuit open,
- a second inductance value $L_{1ss}$ measured on the primary circuit with the secondary circuit short-circuited, and
- a third inductance value $L_{2po}$ measured on the secondary circuit with the primary circuit open,
satisfy the following condition:

$$L_{2PO} - \frac{1}{n^2}L_M < \left(\frac{1}{A}\right) \cdot (L_{1SO} - L_M)$$

with $$L_M = \sqrt{(L_{1SO} - L_{1SS}) \times L_{1SO} \cdot N^2}$$

where A is a real number greater than 10 and less than or equal to 100; and
where N is a transformation ratio of the transformer.

2. The electrical transformer according to claim 1, wherein A is a real number greater than or equal to 50.

3. A method for producing the electrical transformer of claim 1, said method comprising the following steps:
- a selection of a magnetic core geometry for the electrical transformer to produce;
- a determination of a thickness of an air gap corresponding to a desired magnetising inductance value of the electrical transformer to produce;
- secondary windings on the magnetic core having the selected magnetic core geometry and a thickness of the air gap so as to cover said air gap;
- a determination of a leakage reluctance value of the electrical transformer as a function of a ratio between a desired leakage inductance value on the primary circuit of the electrical transformer to produce and the desired magnetising inductance value of the electrical transformer to produce;
- a determination of a distance h between the primary windings, configured to form the primary circuit of the electrical transformer to produce and the secondary windings, as a function of said leakage reluctance value; and
- a winding of the primary windings on the magnetic core of the electrical transformer at said distance h from the secondary windings.

4. The method according to claim 3, wherein the magnetic core is selected from type E or type EI.

5. The method according to claim 4, wherein the following equation is implemented:

$$L_M = N_1^2 * \frac{\mu_0 S}{e}$$

where $N_1$ is the number of windings on the primary circuit, $\mu_0$ is the electromagnetic permeability of air and S is the effective magnetic cross section area of the electrical transformer,
to determine the value of the required thickness e of the air gap, corresponding to the desired magnetising inductance value $L_M$.

6. The method according to claim 4, wherein the following equations are implemented:

$$Rgap = \frac{1}{\mu_0} * \frac{e}{S}$$

where $R_{gap}$ is the air gap reluctance of the electrical transformer, $\mu_0$ is the electromagnetic permeability of air, e is the thickness of the air gap of the electrical transformer and S is the effective magnetic cross section area of the electrical transformer and $$\frac{Rgap}{Rleakage} = \frac{Lf1}{L_M}$$

where Rleakage is the leakage reluctance of the electrical transformer, Lf1 is the leakage inductance on the primary circuit of the electrical transformer and $L_M$ is the magnetising inductance of the electrical transformer, to determine the leakage reluctance value of the electrical transformer.

7. The method according to claim 4, wherein the following equation is implemented:

$$Rleakage = \frac{1}{2\mu_0} * \frac{l}{h * m}$$

where Rleakage is the leakage reluctance of the electrical transformer, $\mu_0$ is the electromagnetic permeability of air, m is the magnetic core depth of the electrical transformer and l is the width of an electromagnetic leakage zone between the primary windings and the secondary windings, corresponding to the distance separating an outer leg and a central leg of the magnetic core of type E or of type EI,
to determine the value of the distance h between the primary windings and the secondary windings.

* * * * *